US012376161B2

(12) United States Patent
Hua et al.

(10) Patent No.: US 12,376,161 B2
(45) Date of Patent: *Jul. 29, 2025

(54) SYSTEMS AND METHODS FOR NETWORK SLICE TRAFFIC IDENTIFICATION USING DYNAMIC NETWORK ADDRESSING

(71) Applicant: Verizon Patent and Licensing Inc., Basking Ridge, NJ (US)

(72) Inventors: Suzann Hua, Beverly Hills, CA (US); Sudhakar Reddy Patil, Flower Mound, TX (US); Parry Cornell Booker, Sunnyvale, TX (US); David Taft, Keller, TX (US); Raymond WaiMan So, San Ramon, CA (US); Lap Tse, Marietta, GA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/415,744

(22) Filed: Jan. 18, 2024

(65) Prior Publication Data

US 2024/0155706 A1 May 9, 2024

Related U.S. Application Data

(63) Continuation of application No. 17/657,806, filed on Apr. 4, 2022, now Pat. No. 11,903,044.

(51) Int. Cl.
*H04W 76/10* (2018.01)
*H04L 45/745* (2022.01)
*H04W 40/24* (2009.01)
*H04W 48/18* (2009.01)

(52) U.S. Cl.
CPC .......... *H04W 76/10* (2018.02); *H04L 45/745* (2013.01); *H04W 40/248* (2013.01); *H04W 48/18* (2013.01)

(58) Field of Classification Search
CPC ......... H04L 49/65; H04L 45/60; H04L 49/111
See application file for complete search history.

(56) References Cited

U.S. PATENT DOCUMENTS

| | | | |
|---|---|---|---|
| 2019/0191367 A1* | 6/2019 | Ni .......................... | H04W 76/11 |
| 2020/0221340 A1* | 7/2020 | Hirata ................... | H04L 61/103 |
| 2020/0329516 A1* | 10/2020 | Yau ......................... | H04L 67/56 |
| 2021/0136653 A1* | 5/2021 | Zhang ................... | H04W 48/18 |
| 2021/0321325 A1* | 10/2021 | Srivastava ............ | H04W 80/02 |
| 2022/0021590 A1* | 1/2022 | Seetharaman ...... | H04L 41/5025 |
| 2023/0156828 A1* | 5/2023 | Hu ........................ | H04W 76/12 |
| | | | 370/329 |

(Continued)

*Primary Examiner* — Luat Phung

(57) ABSTRACT

A network device may maintain a list of existing slice identifiers, associated with slices of a core network, that are in use in active UE sessions, and may receive a slice identifier associated with a slice of the core network and provided in a request to establish a session between a UE and the slice of the core network. The network device may determine whether the slice identifier matches an existing slice identifier included in the list, and may create a new network address, with an address of the network device and the slice identifier, based on the slice identifier failing to match an existing slice identifier included in the list. The network device may utilize the new network address to establish the session between the UE and the slice of the core network.

20 Claims, 10 Drawing Sheets

(56) References Cited

U.S. PATENT DOCUMENTS

| | | | | |
|---|---|---|---|---|
| 2023/0179638 A1* | 6/2023 | Hu | .......................... | H04L 63/20 |
| | | | | 726/1 |
| 2023/0224272 A1* | 7/2023 | Zhang | ................... | H04L 61/503 |
| | | | | 709/226 |
| 2023/0232229 A1* | 7/2023 | Raghavachari | ....... | H04W 12/08 |
| | | | | 726/1 |
| 2023/0275833 A1* | 8/2023 | Hyun | ...................... | H04L 47/00 |
| | | | | 370/389 |
| 2023/0319904 A1* | 10/2023 | Hua | .................... | H04W 40/248 |
| | | | | 370/329 |

* cited by examiner

SYSTEMS AND METHODS FOR NETWORK SLICE TRAFFIC IDENTIFICATION USING DYNAMIC NETWORK ADDRESSING

RELATED APPLICATION

This application is a continuation of U.S. patent application Ser. No. 17/657,806, entitled "SYSTEMS AND METHODS FOR NETWORK SLICE TRAFFIC IDENTIFICATION USING DYNAMIC NETWORK ADDRESSING," filed Apr. 4, 2022, which is incorporated herein by reference in its entirety.

BACKGROUND

A fifth-generation (5G) transport network connects a 5G radio access network (RAN) and a core network. A transport network may provide ultra-high bandwidth, ultra-low latency, and flexible and intelligent connection services for 5G applications, as needed.

DETAILED DESCRIPTION OF EXAMPLE EMBODIMENTS

Figure 1A:
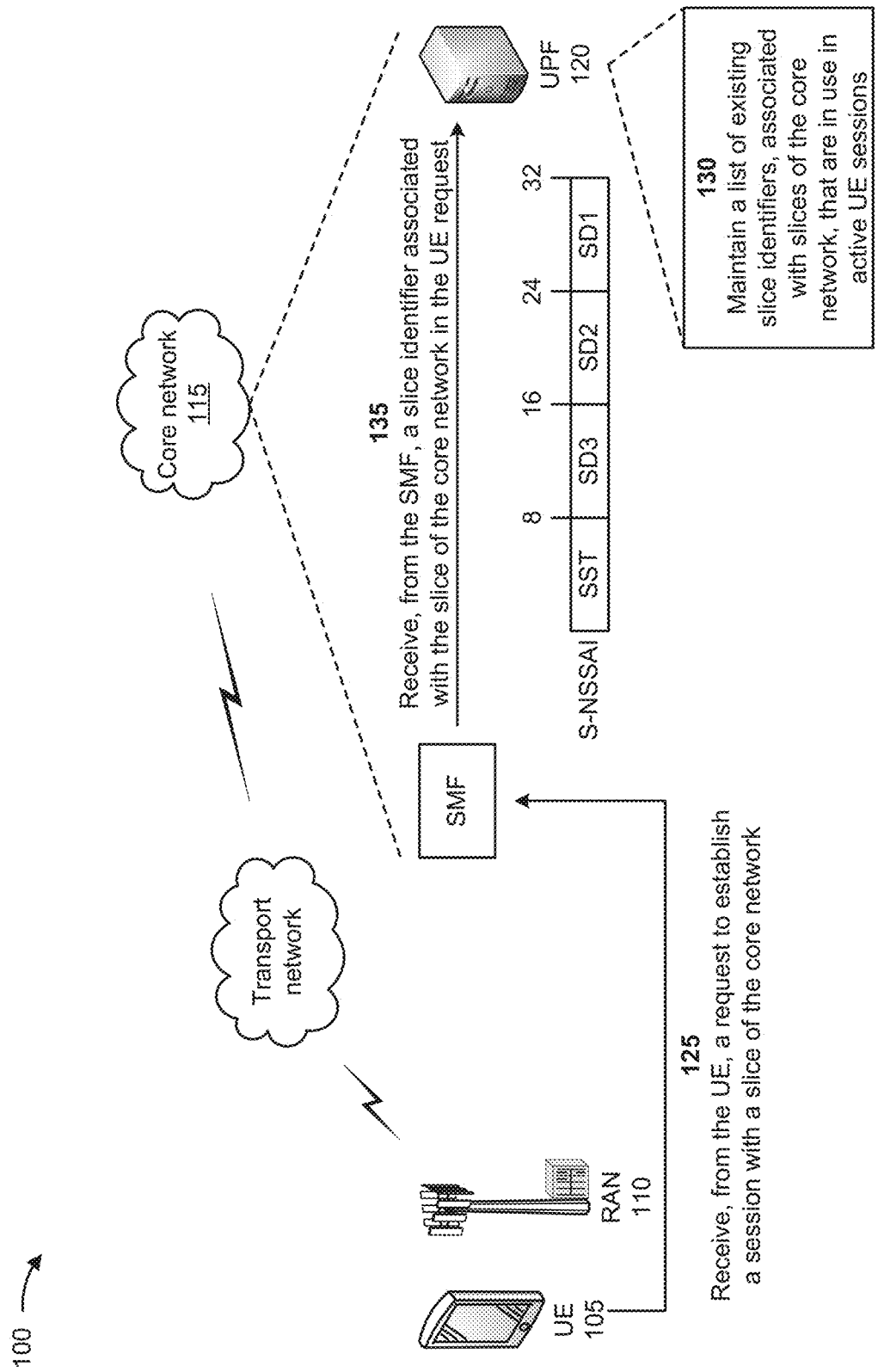
FIGS. 1A-1G are diagrams of an example associated with network slice traffic identification using dynamic network addressing.

The following detailed description of example implementations refers to the accompanying drawings. The same reference numbers in different drawings may identify the same or similar elements.

A network slice is a logical network that provides specific network capabilities and network characteristics. End-to-end traffic identification per network slice is required to better manage the network slice and a service level agreement (SLA) associated with the network slice. Per slice traffic can be directly identified by single network slice selection assistance information (S-NSSAI) in all 5G domains except the transport network. Current methods fail to provide a way to identify per slice traffic for transport networks. Without transport network slice awareness, end-to-end traffic identification per network slice is not possible. For an interface (e.g., an N3 interface) between a RAN and a user plane function (UPF), transport network may identify slice traffic by inspecting host network addresses (e.g., Internet protocol version 6 (IPv6) addresses) in outer packets of an interface tunnel. However, each slice may be required to include a unique network address on the UPF, and a large 5G network may include a large quantity of slices (e.g., up to two hundred and thirty-two (232) slices). This makes fixed provisioning of network slice addresses on all UPFs in the 5G network inefficient and complex to manage. Thus, current mechanisms for providing transport network slice awareness consume computing resources (e.g., processing resources, memory resources, communication resources, and/or the like), networking resources, and/or other resources associated with allocating large quantities of network addresses for network slices, managing the large quantities of network addresses for the network slices, handling additions or deletions of network addresses for the network slices, and/or the like.

Some implementations described herein provide a network device (e.g., a UPF) that provides network slice traffic identification using dynamic network addressing. For example, the UPF may maintain a list of existing slice identifiers, associated with slices of a core network, that are in use in active UE sessions, and may receive a slice identifier associated with a slice of the core network and provided in a request to establish a session between a UE and the slice of the core network. The UPF may determine whether the slice identifier matches an existing slice identifier included in the list, and may utilize an existing network address, associated with an existing slice identifier included in the list, to establish the session between the UE and the slice of the core network when the slice identifier matches the existing slice identifier. The UPF may create a new network address, with an address of the network device and the slice identifier, when the slice identifier fails to match an existing slice identifier included in the list, and may utilize the new network address to establish the session between the UE and the slice of the core network.

In this way, the UPF provides network slice traffic identification using dynamic network addressing. For example, the UPF may dynamically assign a network address (e.g., an N3 IPv6 address) based on each network slice that the UPF supports and without provisioning the network address on other UPFs. The UPF may generate a unique network address per slice based on a combination of a UPF address and a slice identifier (e.g., S-NSSAI) received during establishment of a user equipment (UE) session. The network addresses generated by the UPF may remain unique regardless of how many or how frequently network slices are created or deleted. A transport network may identify per slice traffic by inspecting a host source address (e.g., the UPF address) in an outer packet of the per slice traffic. The transport network may identify the slice identifier from a header of the outer packet. Thus, the UPF may conserve computing resources, networking resources, and/or other resources that would otherwise have been consumed in allocating large quantities of network addresses for network slices, managing the large quantities of network addresses for the network slices, handling additions or deletions of network addresses for the network slices, and/or the like.

FIGS. 1A-1G are diagrams of an example 100 associated with network slice traffic identification using dynamic network addressing. As shown in FIGS. 1A-1G, example 100 may include a UE 105, a RAN 110, and a core network 115. The core network 115 may include a UPF 120 and a session management function (SMF). Further details of the UE 105, the RAN 110, the core network 115, the UPF 120, and the SMF are provided elsewhere herein. Although only a single UE 105 and RAN 110 are depicted in FIG. 1A, in some implementations multiple UEs 105 and RANs 110 may be associated with the core network 115.

As shown in FIG. 1A, and by reference number 125, the SMF may receive, from the UE 105, a request to establish a session with a slice of the core network 115. For example, the UE 105 may generate a protocol data unit (PDU) session establishment request that includes a slice identifier (e.g., S-NSSAI) associated with the slice of the core network 115. The UE 105 may provide the PDU session establishment request to an access and mobility management function (AMF) of the core network 115, via the transport network.

The AMF may select the SMF based on the slice identifier included in the PDU session establishment request, and may provide the PDU session establishment request to the SMF. The SMF may receive the PDU session establishment request from the AMF.

As further shown in FIG. 1A, and by reference number 130, the UPF 120 may maintain a list of existing slice identifiers, associated with slices of the core network 115, that are in use in active UE sessions. For example, the UPF 120 may receive (e.g., from the core network 115) information identifying the active UE sessions, the slices associated with the active UE sessions, and the existing slice identifiers associated with the slices. The UPF 120 may store the information identifying the active UE sessions, the slices associated with the active UE sessions, and the existing slice identifiers, as the list of existing slice identifiers, in a data structure (e.g., a database, a list, a table, and/or the like) associated with the UPF 120.

As further shown in FIG. 1A, and by reference number 135, the UPF 120 may receive, from the SMF, a slice identifier associated with the slice of the core network 115 and provided in the UE request to establish the session with the slice. For example, the SMF may provide, to the UPF 120, the PDU session establishment request that includes the slice identifier (e.g., S-NSSAI) associated with the slice of the core network 115, and the UPF 120 may receive the PDU session establishment request from the SMF. The slice identifier (e.g., S-NSSAI) may include a quantity of bits (e.g., thirty-two bits) of information, such as a slice service type (SST), a first slice differentiator (SD1), a second slice differentiator (SD2), and a third slice differentiator (SD3). The SST refers to an expected network slice behavior in terms of features and services. The slice differentiators (SDs) provide optional information that complements the SSTs to differentiate among multiple network slices of a same SST.

Figure 1B:
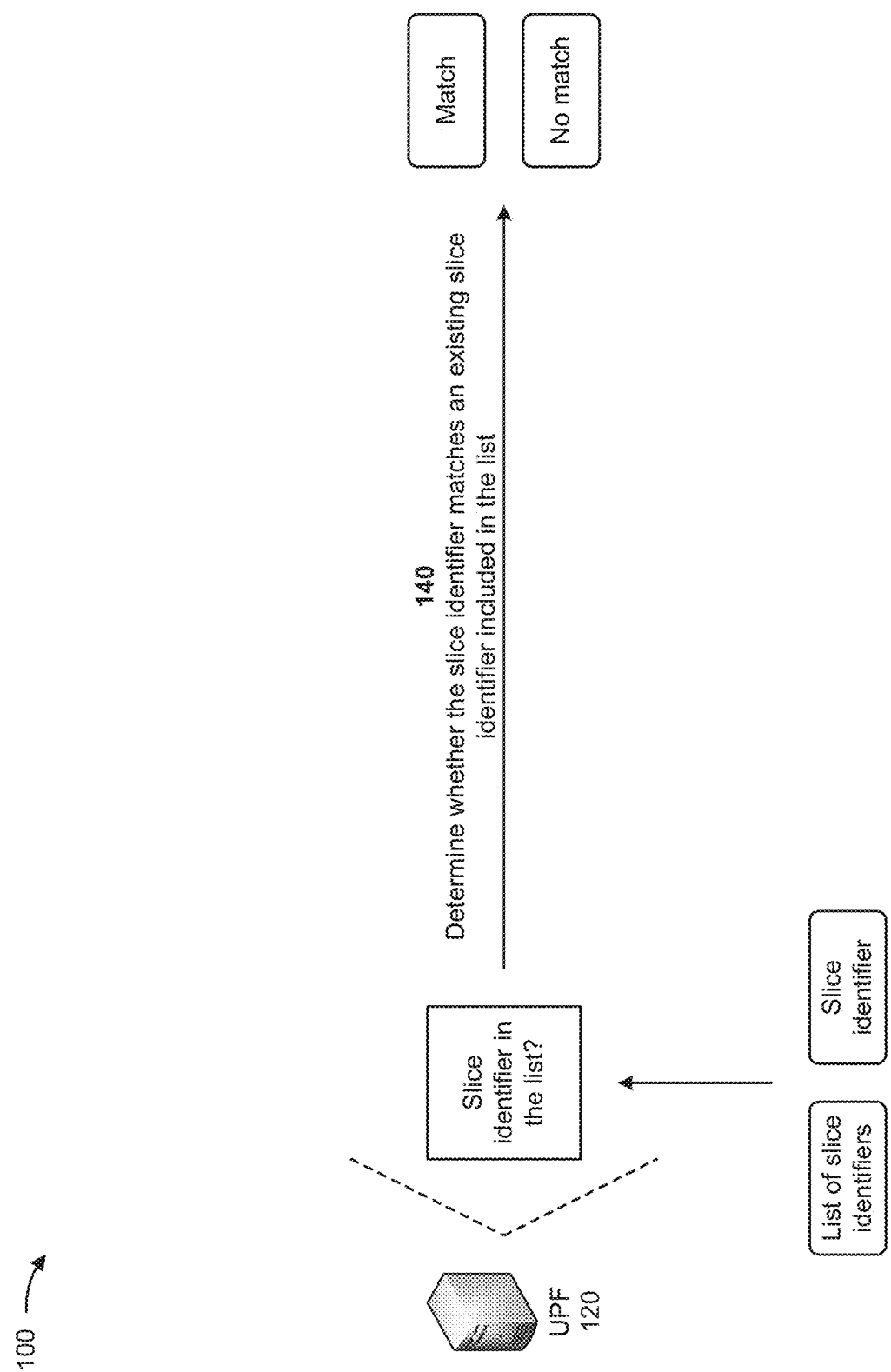

As shown in FIG. 1B, and by reference number 140, the UPF 120 may determine whether the slice identifier matches an existing slice identifier included in the list. For example, the UPF 120 may compare the slice identifier, provided in the UE request to establish the session with the slice, with the existing slice identifiers included in the list of existing slice identifiers. The UPF 120 may determine whether the slice identifier matches the existing slice identifier included in the list based on the comparison. In some implementations, the UPF 120 may determine that the slice identifier matches an existing slice identifier included in the list when the S-NSSAI provided in the UE request matches an existing S-NSSAI included in the list. Alternatively, the UPF 120 may determine that the slice identifier fails to match an existing slice identifier included in the list when the S-NSSAI provided in the UE request fails to match any of the existing S-NSSAIs included in the list.

Figure 1C:
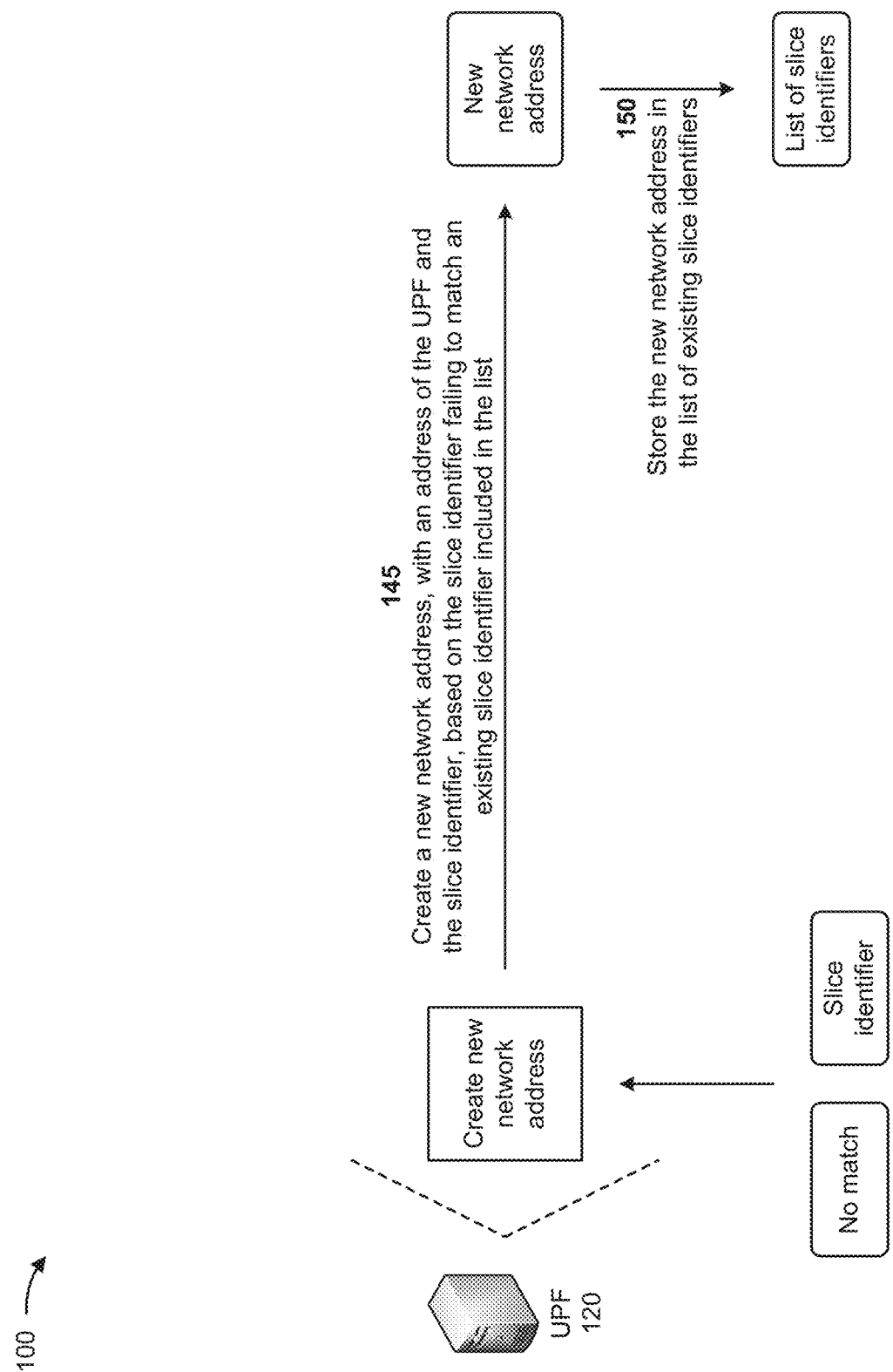

As shown in FIG. 1C, and by reference number 145, the UPF 120 may create a new network address, with an address of the UPF 120 and the slice identifier, based on the slice identifier failing to match an existing slice identifier included in the list. For example, when the UPF 120 determines that the slice identifier fails to match an existing slice identifier included in the list, the UPF 120 may create a new network address (e.g., an N3 Internet protocol version 6 (IPv6) address) based on the address of the UPF 120 and the slice identifier. In some implementations, the UPF 120 may create the new network address (e.g., per slice) based on a combination of the address of the UPF 120 (e.g., a global network address of the UPF 120, a subnet identifier of the UPF 120, and portions of a lower sixty-four bits of an interface identifier of the UPF 120) and the slice identifier (e.g., the S-NSSAI) provided in the UE request to establish the session with the slice. The new network address may remain unique regardless of how many or how frequently slices are created or deleted, and may be associated with other 5G interfaces (e.g., other than the N3 interface, such as in cases where tunneling is required over an N6 interface on the UPF 120). The new network address may be utilized to establish a session between the UE 105 and the slice of the core network 115. Examples of the new network address are provided below in connection with FIG. 1D.

As further shown in FIG. 1C, and by reference number 150, the UPF 120 may store the new network address in the list of existing slice identifiers. For example, the UPF 120 may store the new network address, with the list of existing slice identifiers, in the data structure associated with the UPF 120. Thus, the new network address may become an existing slice identifier in the list of existing slice identifiers. In this way, adding or deleting slices will no longer require provisioning of N3 IPv6 addresses on the UPF 120.

Figure 1D:
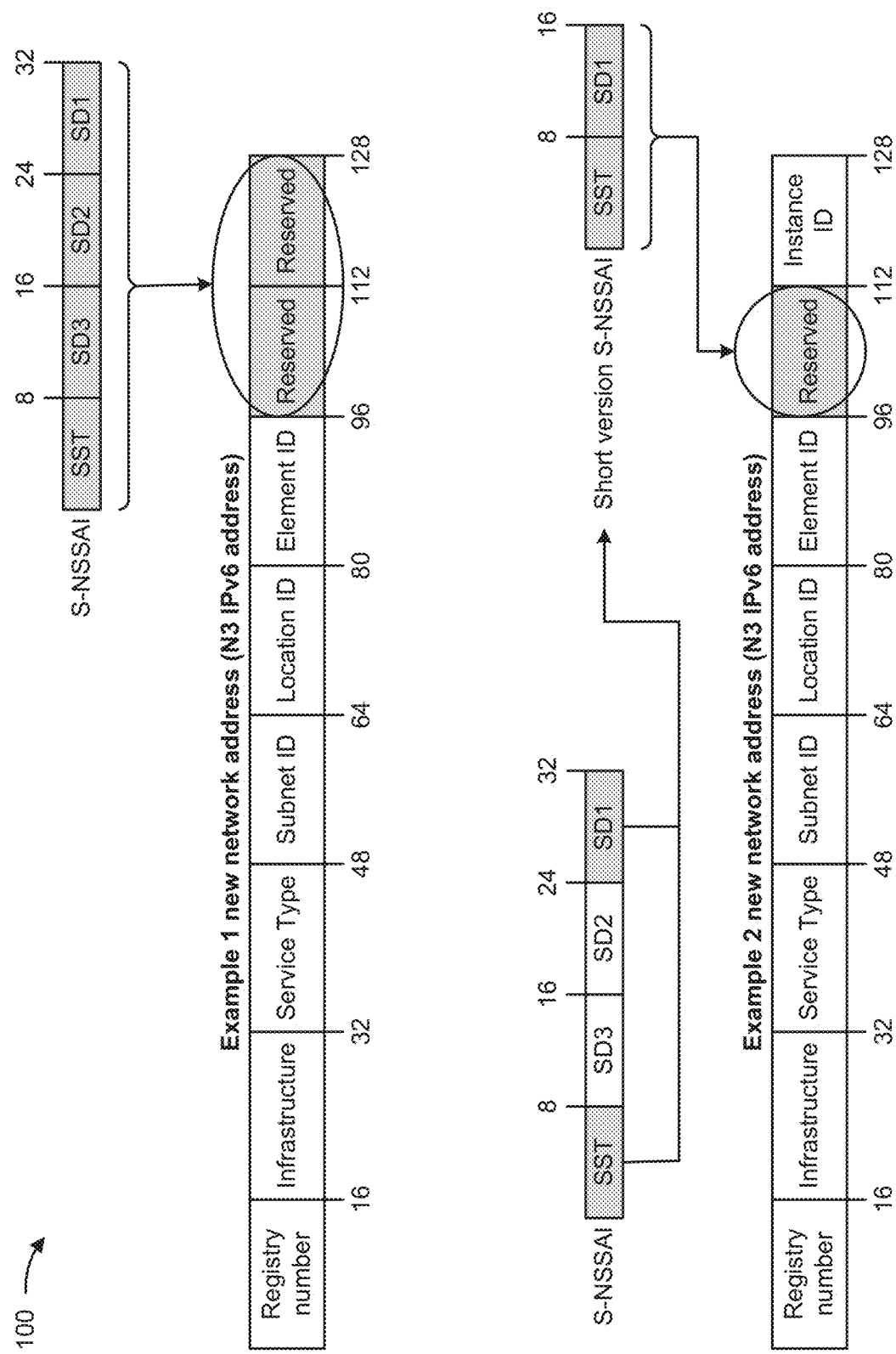

FIG. 1D depicts examples of new network addresses that may be created by the UPF 120. As shown, a first example new network address may include a registry number portion, an infrastructure portion, a service type portion, a subnet identifier (ID) portion, a location ID portion, an element ID portion, and two reserved portions. The registry number portion may include a registry number associated with a global network address of the UPF 120. The infrastructure portion may include information identifying a network infrastructure associated with the UPF 120. The service type portion may include information identifying a network service type associated with the UPF 120. The subnet ID portion may include a subnet ID associated with the UPF 120. The location ID portion may include a location ID associated with the UPF 120. The element ID portion may include an element ID associated with the UPF 120. The reserved portions may include sixteen (16) or thirty-two (32) bits for storing the slice identifier (e.g., the S-NSSAI) provided in the UE request. If thirty-two bits are provided in the reserved portions, the entire S-NSSAI may be provided in the reserved portions. For example, the SST, the SD1, the SD2, and the SD3 of the S-NSSAI may be stored in the reserved portions.

As further shown in FIG. 1D, a second example new network address may include the registry number portion, the infrastructure portion, the service type portion, the subnet ID portion, the location ID portion, and the element ID portion, as described above. However, a single reserved portion (e.g., with sixteen bits of space) and an instance ID portion are provided in the second example new network address. The instance ID portion may include an instance ID associated with the UPF 120. Since only sixteen bits of space are provided in the reserved portion, the UPF 120 may generate a shorter version of the S-NSSAI. For example, the SST and the SD1 of the S-NSSAI may be stored in the reserved portion. The UPF 120 may utilize more complex calculations to generate the shorter version of the S-NSSAI if the reserved portion is less than sixteen bits. In some implementations, the UPF 120 may utilize other portions of the new network address to store the slice identifier (e.g., the S-NSSAI).

Figure 1E:
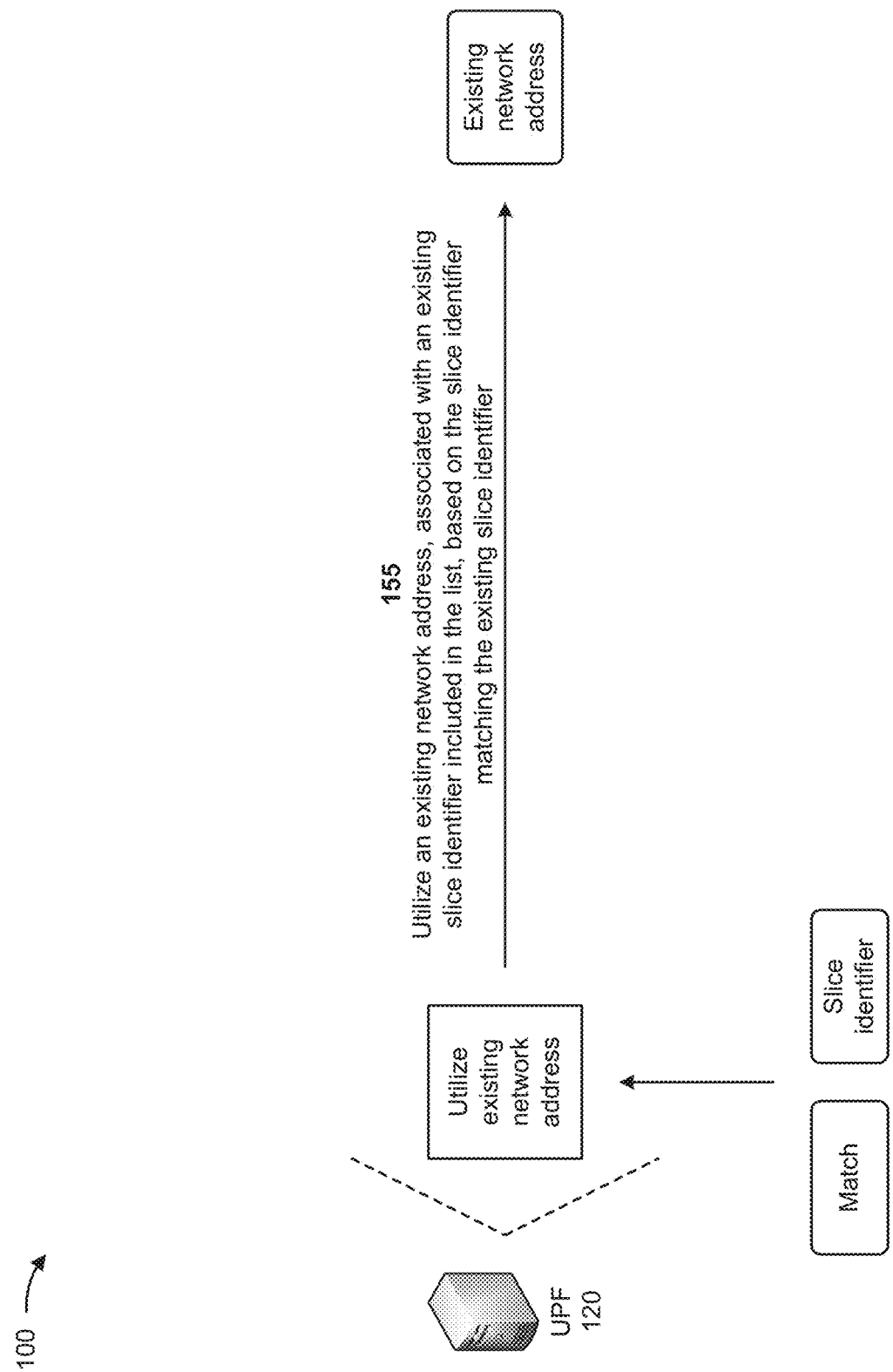

As shown in FIG. 1E, and by reference number 155, the UPF 120 may utilize an existing network address, associated with an existing slice identifier included in the list, based on the slice identifier matching the existing slice identifier. For example, when the UPF 120 determines that the slice identifier matches an existing slice identifier included in the list, the UPF 120 may identify the existing network address associated with the existing slice identifier. In some implementations, the existing slice identifiers of the list may be associated with existing network addresses of network slices identified by the existing slice identifiers. Thus, the UPF 120 may identify, from the list, the matching existing slice identifier and the existing network address associated with the matching existing slice identifier. The existing network address may be utilized to establish a session between the UE 105 and the slice of the core network 115.

Figure 1F:
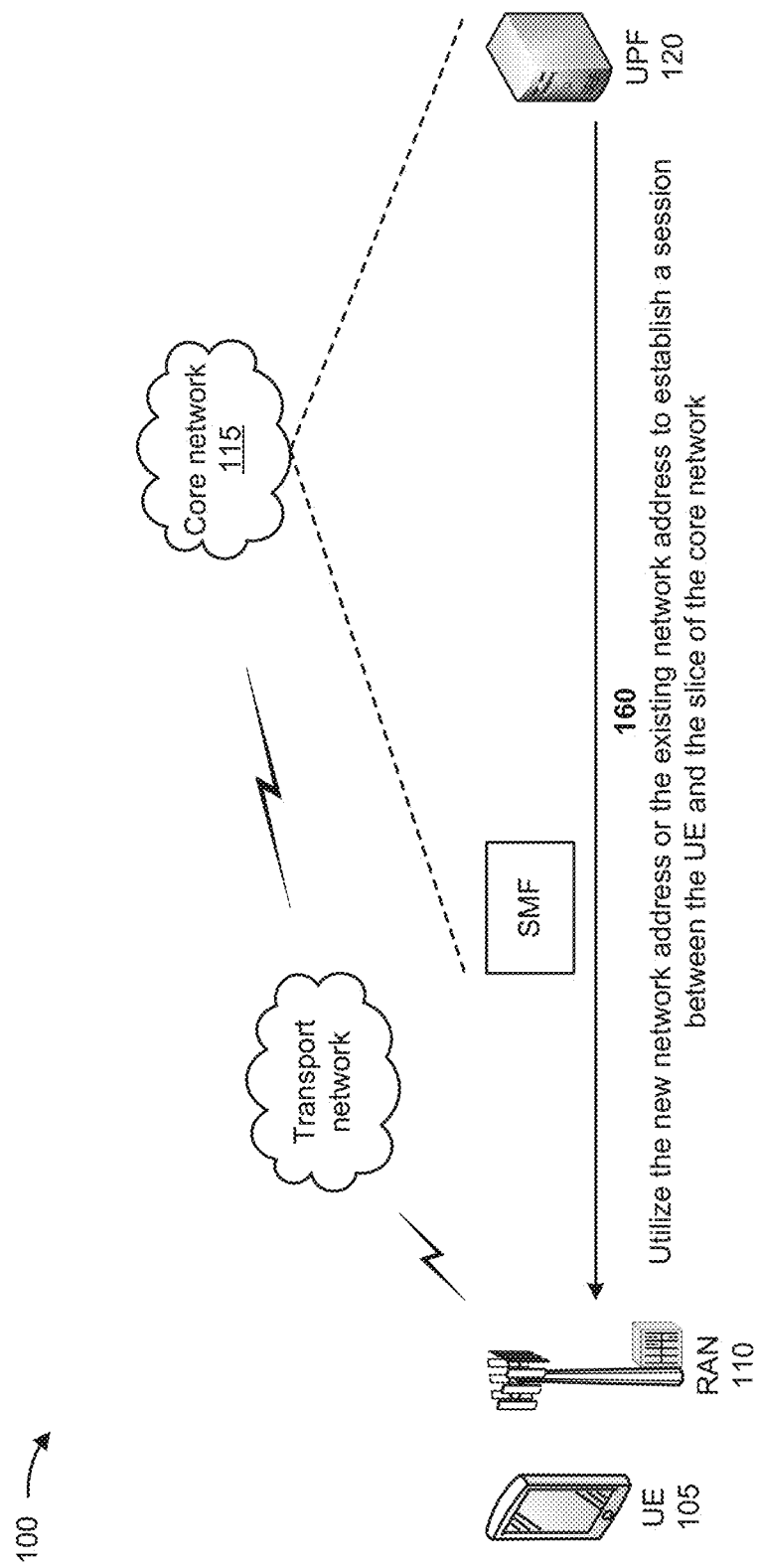

As shown in FIG. 1F, and by reference number 160, the UPF 120 may utilize the new network address or the existing network address to establish a session between the UE 105 and the slice of the core network 115. For example, when the UPF 120 determines that the slice identifier fails to match an existing slice identifier included in the list, the UPF 120 may utilize the new network address to establish the session between the UE 105 and the slice of the core network 115. The UE 105 may establish the session with the slice of the core network 115 based on the new network address. Alternatively, when the UPF 120 determines that the slice identifier matches an existing slice identifier included in the list, the UPF 120 may utilize the existing network address to establish the session between the UE 105 and the slice of the core network 115. The UE 105 may establish the session with the slice of the core network 115 based on the existing network address.

Figure 1G:
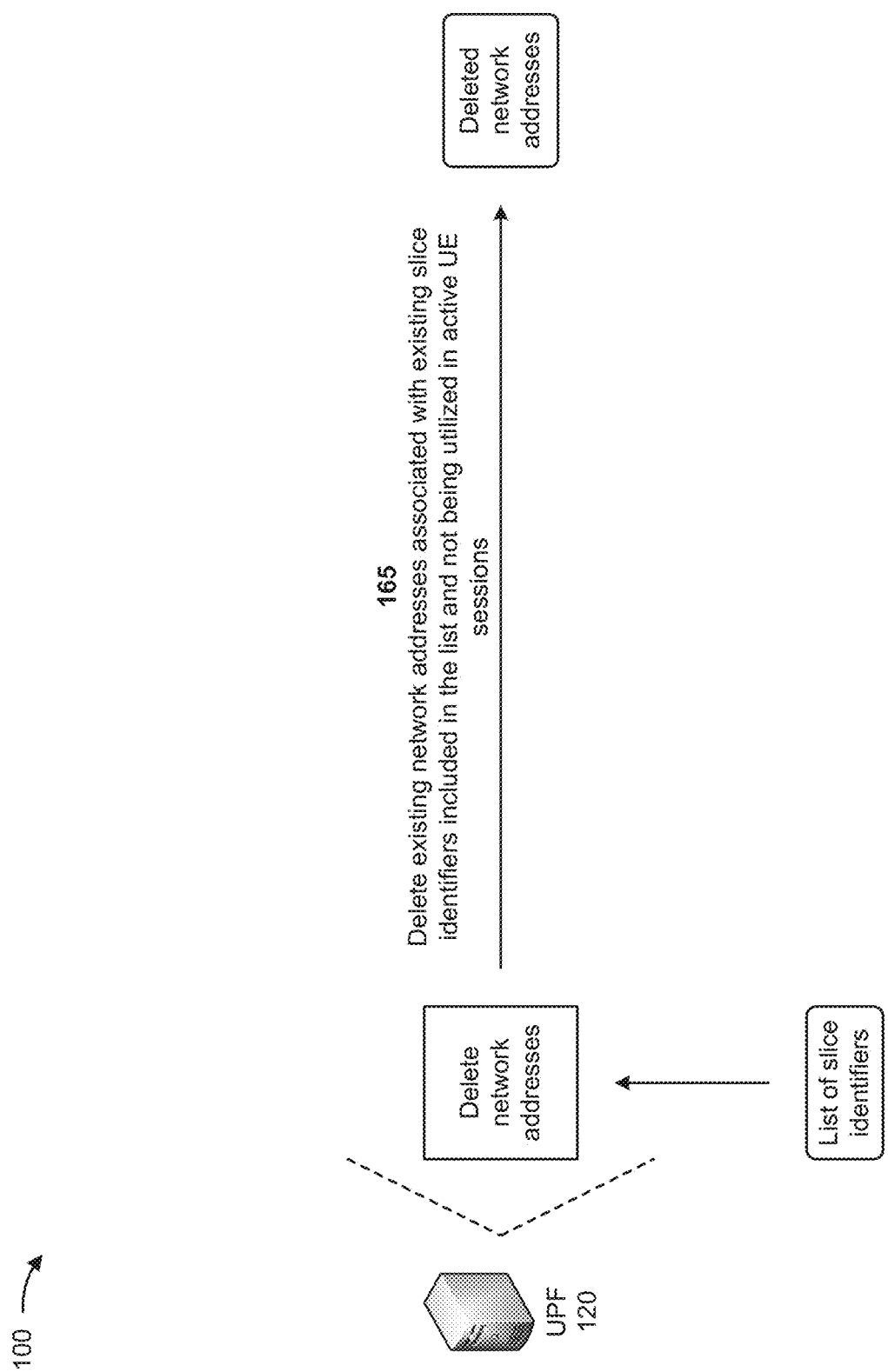

As shown in FIG. 1G, and by reference number 165, the UPF 120 may delete existing network addresses associated with existing slice identifiers included in the list and not being utilized in active UE sessions. For example, the UPF 120 may delete, from the list, existing network addresses that are associated with existing slice identifiers that are not in use in active UE sessions. In some implementations, whenever a new network slice is added to the core network 115 or deleted from the core network 115, the UPF 120 may update the list by adding a network address associated with the new network slice to the list or by deleting an existing network address associated with the deleted network slice from the list.

In some implementations, the traffic network may identify per slice traffic by inspecting a host source address (e.g., the address of the UPF 120) in an outer packet of traffic (e.g., N3 traffic). The traffic network may determine the slice identifier (e.g., the S-NSSAI) from the outer packet IPv6 header, and may provide a key performance indicator (KPI) measurement per slice. The traffic network may also utilize a path computation element (PCE) to determine traffic routing decisions based on specific characteristics of a slice (e.g., low latency takes path 1, moderate latency takes path 2, best effort latency takes path 3, and/or the like).

In this way, the UPF 120 provides network slice traffic identification using dynamic network addressing. For example, the UPF 120 may dynamically assign a network address based on each network slice that the UPF supports and without provisioning the network address on other UPFs. The UPF 120 may generate a unique network address per slice based on a combination of a UPF address and a slice identifier received during establishment of a UE session. The network addresses generated by the UPF 120 may remain unique regardless of how many or how frequently network slices are created or deleted. A transport network may identify per slice traffic by inspecting a host sources address (e.g., the UPF address) in an outer packet of the per slice traffic. The transport network may identify the slice identifier from a header of the outer packet. Thus, the UPF 120 may conserve computing resources, networking resources, and/or other resources that would otherwise have been consumed in allocating large quantities of network addresses for network slices, managing the large quantities of network addresses for the network slices, handling additions or deletions of network addresses for the network slices, and/or the like.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
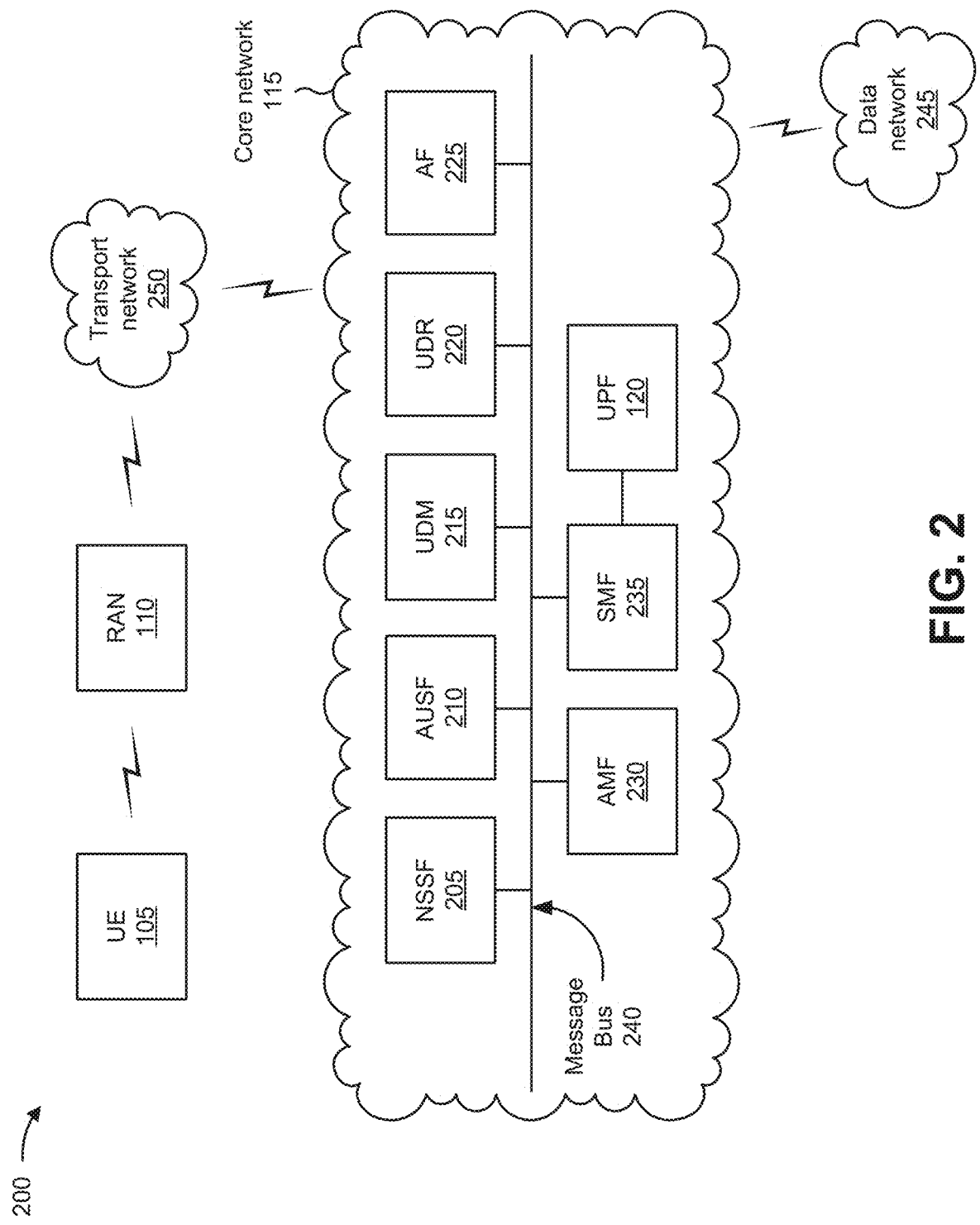
FIG. 2 is a diagram of an example environment in which systems and/or methods described herein may be implemented.

FIG. 2 is a diagram of an example environment 200 in which systems and/or methods described herein may be implemented. As shown in FIG. 2, the example environment 200 may include the UE 105, the RAN 110, the core network 115, a data network 245, and a transport network 250. Devices and/or networks of the example environment 200 may interconnect via wired connections, wireless connections, or a combination of wired and wireless connections.

The UE 105 includes one or more devices capable of receiving, generating, storing, processing, and/or providing information, such as information described herein. For example, the UE 105 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

The RAN 110 may support, for example, a cellular radio access technology (RAT). The RAN 110 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for the UE 105. The RAN 110 may transfer traffic between the UE 105 (e.g., using a cellular RAT), one or more base stations (e.g., using a wireless interface or a backhaul interface, such as a wired backhaul interface), and/or the core network 115. The RAN 110 may provide one or more cells that cover geographic areas.

In some implementations, the RAN 110 may perform scheduling and/or resource management for the UE 105 covered by the RAN 110 (e.g., the UE 105 covered by a cell provided by the RAN 110). In some implementations, the RAN 110 may be controlled or coordinated by a network controller, which may perform load balancing, network-level configuration, and/or other operations. The network controller may communicate with the RAN 110 via a wireless or wireline backhaul. In some implementations, the RAN 110 may include a network controller, a self-organizing network (SON) module or component, or a similar module or component. In other words, the RAN 110 may perform network control, scheduling, and/or network management functions (e.g., for uplink, downlink, and/or sidelink communications of the UE 105 covered by the RAN 110).

In some implementations, the core network 115 may include an example functional architecture in which systems and/or methods described herein may be implemented. For example, the core network 115 may include an example architecture of a 5G next generation (NG) core network included in a 5G wireless telecommunications system. While the example architecture of the core network 115 shown in FIG. 2 may be an example of a service-based architecture, in some implementations, the core network 115 may be implemented as a reference-point architecture and/or a 4G core network, among other examples.

As shown in FIG. 2, the core network 115 may include a number of functional elements. The functional elements may include, for example, the UPF 120, a network slice selection function (NSSF) 205, an authentication server function (AUSF) 210, a unified data management (UDM) device 215, a unified data repository (UDR) 220, an application function (AF) 225, an AMF 230, and/or an SMF 235. These functional elements may be communicatively connected via a message bus 240. Each of the functional elements shown in FIG. 2 is implemented on one or more devices associated with a wireless telecommunications system. In some implementations, one or more of the functional elements may be implemented on physical devices, such as an access point, a base station, and/or a gateway. In some implementations, one or more of the functional elements may be implemented on a computing device of a cloud computing environment.

The UPF 120 includes one or more devices that serve as an anchor point for intraRAT and/or interRAT mobility. The UPF 120 may apply rules to packets, such as rules pertaining to packet routing, traffic reporting, and/or handling user plane QoS, among other examples.

The NSSF 205 includes one or more devices that select network slice instances for the UE 105. By providing network slicing, the NSSF 205 allows an operator to deploy multiple substantially independent end-to-end networks potentially with the same infrastructure. In some implementations, each slice may be customized for different services.

The AUSF 210 includes one or more devices that act as an authentication server and support the process of authenticating the UE 105 in the wireless telecommunications system.

The UDM device 215 includes one or more devices that store (e.g., in the UDR 220) user data and profiles in the wireless telecommunications system. The UDM device 215 may be used for fixed access and/or mobile access in the core network 115.

The UDR 220 includes one or more devices that include a data structure (e.g., a database, a table, a list, and/or the like) that stores subscription-related data associated with the wireless telecommunications system. The UDR 220 may store data grouped into distinct collections of subscription-related information, such as, for example, subscription data, policy data, structured data for exposure, application data, and/or the like.

The AF 225 includes one or more devices that support application influence on traffic routing, access to other functions, and/or policy control, among other examples.

The AMF 230 includes one or more devices that act as a termination point for non-access stratum (NAS) signaling and/or mobility management, among other examples.

The SMF 235 includes one or more devices that support the establishment, modification, and release of communication sessions in the wireless telecommunications system. For example, the SMF 235 may configure traffic steering policies at the UPF 120 and/or may enforce user equipment Internet protocol (IP) address allocation and policies, among other examples.

The message bus 240 represents a communication structure for communication among the functional elements. In other words, the message bus 240 may permit communication between two or more functional elements.

The data network 245 includes one or more wired and/or wireless data networks. For example, the data network 245 may include an IP multimedia subsystem (IMS) network, a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or a combination of these or other types of networks.

The transport network 250 includes one or more wired and/or wireless networks that connect the RAN 110 and the core network 115. The transport network 250 may provide ultra-high bandwidth, ultra-low latency, and flexible and intelligent connection services for 5G applications.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the example environment 200 may perform one or more functions described as being performed by another set of devices of the example environment 200.

Figure 3:
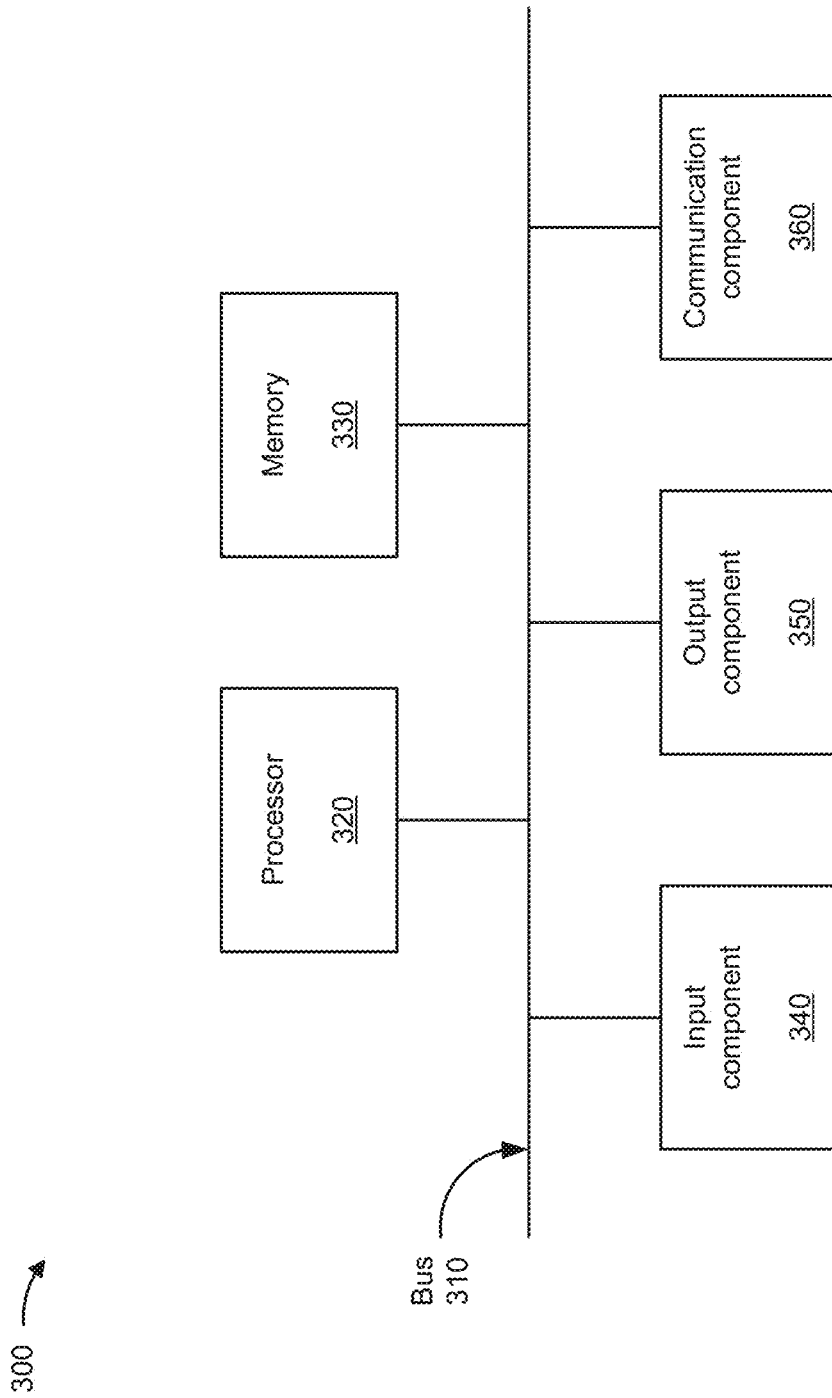
FIG. 3 is a diagram of example components of one or more devices of FIG. 2.

FIG. 3 is a diagram of example components of a device 300, which may correspond to the UE 105, the RAN 110, the UPF 120, the NSSF 205, the AUSF 210, the UDM device 215, the UDR 220, the AF 225, the AMF 230, and/or the SMF 235. In some implementations, the UE 105, the RAN 110, the UPF 120, the NSSF 205, the AUSF 210, the UDM device 215, the UDR 220, the AF 225, the AMF 230, and/or the SMF 235 may include one or more devices 300 and/or one or more components of the device 300. As shown in FIG. 3, the device 300 may include a bus 310, a processor 320, a memory 330, an input component 340, an output component 350, and a communication component 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. Memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication component 360 enables the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
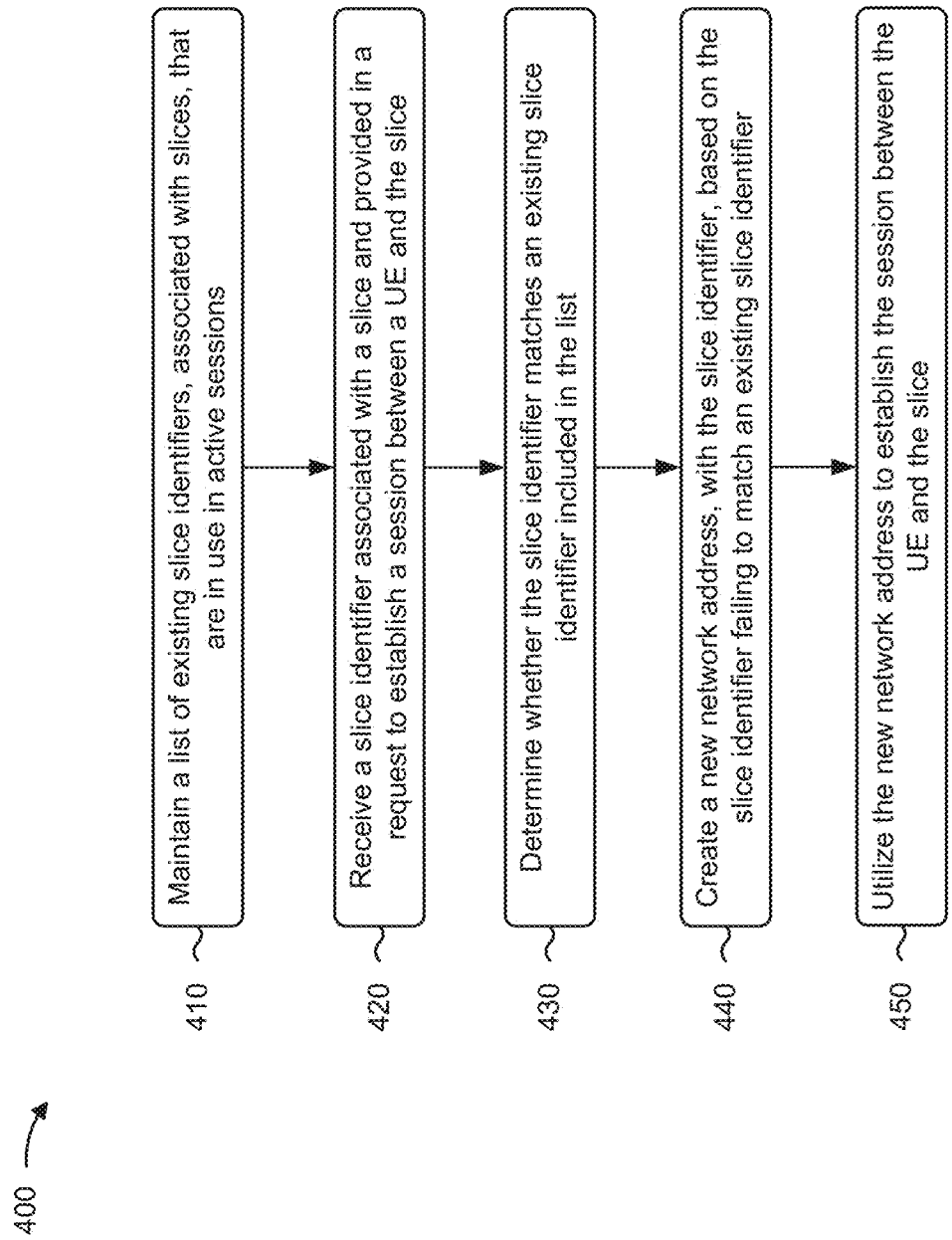
FIG. 4 is a flowchart of an example process for network slice traffic identification using dynamic network addressing.

FIG. 4 is a flowchart of an example process 400 for network slice traffic identification using dynamic network addressing. In some implementations, one or more process blocks of FIG. 4 may be performed by a network device (e.g., the UPF 120). In some implementations, one or more process blocks of FIG. 4 may be performed by another device or a group of devices separate from or including the network device, such as an SMF (e.g., the SMF 235). Additionally, or alternatively, one or more process blocks of FIG. 4 may be performed by one or more components of the device 300, such as the processor 320, the memory 330, the input component 340, the output component 350, and/or the communication component 360.

As shown in FIG. 4, process 400 may include maintaining a list of existing slice identifiers, associated with slices, that are in use in active UE sessions (block 410). For example, the network device may maintain a list of existing slice identifiers, associated with slices of a core network, that are in use in active UE sessions, as described above.

As further shown in FIG. 4, process 400 may include receiving a slice identifier associated with a slice and provided in a request to establish a session between a UE and the slice (block 420). For example, the network device may receive a slice identifier associated with a slice of the core network and provided in a request to establish a session between a UE and the slice of the core network, as described above. In some implementations, the slice identifier is single network slice selection assistance information. In some implementations, receiving the slice identifier associated with the slice of the core network includes receiving the slice identifier from a session management function during UE session establishment procedures.

As further shown in FIG. 4, process 400 may include determining whether the slice identifier matches an existing slice identifier included in the list (block 430). For example, the network device may determine whether the slice identifier matches an existing slice identifier included in the list, as described above.

As further shown in FIG. 4, process 400 may include creating a new network address, with the slice identifier, based on the slice identifier failing to match an existing slice identifier included in the list (block 440). For example, the network device may create a new network address, with an address of the network device and the slice identifier, based on the slice identifier failing to match an existing slice identifier included in the list, as described above. In some implementations, the new network address is an N3 interface Internet protocol version six address.

In some implementations, creating the new network address, with the address of the network device and the slice identifier includes determining whether a quantity of bits associated with a header of the new network address satisfies a threshold quantity, and providing the slice identifier in the header of the new network address based on the quantity of bits associated with the header of the new network address satisfying the threshold quantity. In some implementations, process 400 includes determining a shortened version of the slice identifier based on the quantity of bits associated with the header of the new network address failing to satisfy the threshold quantity, and providing the shortened version of the slice identifier in the header of the new network address.

As further shown in FIG. 4, process 400 may include utilizing the new network address to establish the session between the UE and the slice (block 450). For example, the network device may utilize the new network address to establish the session between the UE and the slice of the core network, as described above.

In some implementations, process 400 includes utilizing an existing network address, associated with an existing slice identifier included in the list, based on the slice identifier matching the existing slice identifier. In some implementations, process 400 includes utilizing the existing network address to establish the session between the UE and the slice of the core network. In some implementations, process 400 includes storing the new network address in the list of existing slice identifiers. In some implementations, process 400 includes deleting existing network addresses associated with existing slice identifiers included in the list and not being utilized in active UE sessions.

In some implementations, process 400 includes causing a transport network, associated with the core network, to identify per slice traffic based on inspection of the new network address in a packet of the per slice traffic. In some implementations, process 400 includes causing a transport network, associated with the core network, to perform traffic routing decisions based on inspection of the new network address in a packet of per slice traffic.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
  receiving, by a network device, a slice identifier associated with a slice of a core network,
    wherein the core network includes a user plane function (UPF);
  creating, by the network device, a new network address, based on a combination of the slice identifier and an address of one or more of:
    a global network address of the UPF,
    a subnet identifier of the UPF, or
    portions of a lower sixty-four bits of an interface identifier of the UPF, based on the slice identifier failing to match an existing slice identifier included in a list of existing slice identifiers; and
  utilizing the new network address to establish a session between a user equipment (UE) and the slice of the core network.

2. The method of claim 1, wherein the list includes existing slice identifiers that are in use in an active UE session.

3. The method of claim 1, wherein a request is provided to establish a session between the UE and the slice of the core network.

4. The method of claim 1, further comprising:
  causing a transport network to identify per slice traffic and to perform traffic routing decisions based on inspection of the new network address in a packet of the per slice traffic.

5. The method of claim 1, further comprising:
  maintaining the list of existing slice identifiers.

6. The method of claim 1, wherein the slice identifier includes a quantity of bits of information and at least one slice differentiator.

7. The method of claim 1, further comprising:
  deleting existing network addresses associated with existing slice identifiers included in the list and not being utilized in an active UE session.

8. A network device, comprising:
  one or more processors configured to:
    receive a slice identifier associated with a slice of a core network and provided in a request to establish a session between a user equipment (UE) and the slice of the core network, wherein the core network includes a user plane function (UPF);
create a new network address, based on a combination of the slice identifier and an address of one or more of:
a global network address of the UPF,
a subnet identifier of the UPF, or
portions of a lower sixty-four bits of an interface identifier of the UPF, based on the slice identifier failing to match an existing slice identifier included in a list of existing slice identifiers; and
utilize the new network address to establish the session between the UE and the slice of the core network.

9. The network device of claim 8, wherein the one or more processors are further configured to:
determine that a single network slice selection assistance information (S-NSSAI) provided in the request does not match an existing S-NSSAI included in the list.

10. The network device of claim 8, wherein the one or more processors are further configured to:
maintain the list of existing slice identifiers.

11. The network device of claim 8, wherein the one or more processors are further configured to:
cause a transport network to identify per slice traffic based on inspection of the new network address in a packet of the per slice traffic.

12. The network device of claim 8, wherein the one or more processors are further configured to:
delete existing network addresses associated with existing slice identifiers included in the list and not being utilized in an active UE session.

13. The network device of claim 8, wherein the one or more processors, to receive the slice identifier associated with the slice of the core network, are configured to:
receive the slice identifier from a session management function during UE session establishment procedures.

14. The network device of claim 8, wherein the new network address remains unique regardless of how many or how frequently slices are created or deleted, and wherein the new network address is associated with fifth-generation (5G) interfaces.

15. A non-transitory computer-readable medium storing a set of instructions, the set of instructions comprising:
one or more instructions that, when executed by one or more processors of a network device, cause the network device to:
receive a slice identifier associated with a slice of a core network and provided in a request to establish a session between a user equipment (UE) and the slice of the core network,
wherein the core network includes a user plane function (UPF);
create a new network address, based on a combination of the slice identifier and an address of one or more of:
a global network address of the UPF,
a subnet identifier of the UPF, or
portions of a lower sixty-four bits of an interface identifier of the UPF, based on the slice identifier failing to match an existing slice identifier included in a list; and
utilize the new network address to establish the session between the UE and the slice of the core network.

16. The non-transitory computer-readable medium of claim 15, wherein the one or more instructions further cause the network device to:
determine that a single network slice selection assistance information (S-NSSAI) provided in the request does not match an existing S-NSSAI included in the list.

17. The non-transitory computer-readable medium of claim 15, wherein the one or more instructions further cause the network device to:
delete existing network addresses associated with existing slice identifiers included in the list and not being utilized in an active UE session.

18. The non-transitory computer-readable medium of claim 15, wherein the one or more instructions further cause the network device to:
maintain the list of existing slice identifiers that are in use in an active UE session.

19. The non-transitory computer-readable medium of claim 15, wherein the one or more instructions further cause the network device to:
store the new network address in the list of existing slice identifiers.

20. The non-transitory computer-readable medium of claim 15, wherein the one or more instructions further cause the network device to:
cause a transport network to identify per slice traffic and to perform traffic routing decisions based on inspection of the new network address in a packet of the per slice traffic.

* * * * *